Patented Oct. 15, 1929

1,731,976

UNITED STATES PATENT OFFICE

TURE ROBERT HAGLUND, OF STOCKHOLM, SWEDEN

PROCESS FOR PRODUCING METALS AND ALLOYS

No Drawing. Application filed October 16, 1926, Serial No. 142,151, and in Sweden October 23, 1925.

This invention relates to a process for producing metals and alloys by reduction in the electric furnace of oxides or oxide ores under such conditions that a layer of slag covering the metal or alloy is formed.

To facilitate reduction in electro-metallurgical processes it has been suggested to mix oxides or oxide ores in a finely crushed state with the necessary quantity of reducing agent and out of that mixture manufacture briquettes. Hereby the advantage was gained that reduction could take place at a lower temperature than otherwise would have been the case. This process has, however, also its disadvantages, and specially when production of carbon-poor metals is concerned. The course of reduction in the briquettes proceeds continually. Therefore the metal particles reduced out come as a rule easily in contact with such finely divided carbon particles in the briquettes that not yet had time to react with oxide. The result thereof is the formation of carbides that later have to be refined. To lessen the said formation of carbide, the quantity of reducing agent in the briquettes was usually decreased. This means, however, could hitherto be applied only to a very restricted extent, because it caused a very limited yield of metal.

This invention has for its object among others to remove the last named disadvantage. According to the process that is the object of the present invention only a part of the reducing agent intended for the reduction of the oxides present in the briquettes is added within the briquettes, whereas another part is added separately. This latter part of the reducing agent may according to this invention consist either of carbonaceous reducing agent, such as coke, anthracite, char-coal, or the same may partly consist of metallic reagents. The quantity of reducing agent present in the briquettes may be varied within rather wide limits and needs not necessarily wholly consist of carbonaceous material although this as a rule is most desirable. According to this invention, however, the quantity of carbonaceous reducing agent in the briquettes should at least be as large as is necessary for the reduction of 25% of the oxide quantity in the briquettes that will be subjected to reduction, but should be less than 80% except in some cases described below.

When choosing the percentage of reducing agent within the briquettes it is of course necessary to take into consideration the nature of the ore or oxide that is to be reduced. But it is also necessary to consider in which form the reducing agent outside of the briquettes is added. If the latter wholly or partly consists of carbonaceous material in lump or grain form, such as coke, charcoal, anthracite, the best results are usually reached, if a comparatively high percentage of the reducing agent is used within the briquettes, for instance 50—70% or more. In electrothermic processes for reduction of oxides in the commonly used way, for example the production of ferrosilicon, high carbon ferrochromium and the like, by means of lumps or grains of carbon reducing agents, the electric energy is to a very considerable extent spread sideways in the charge, owing to the high electric conductivity of the carbon material and that said carbon material usually in volume constitutes the main part of the charge. By briquetting according to this invention of a part of the carbon material together with oxide or oxide ore, the contact points between remaining unbriquetted carbon particles are reduced in a relatively much higher extent. As the briquettes themselves are very poor conductors for the current, therefore already a patial briquetting of the carbon with oxide will have the result that the energy mainly is concentrated to a zone between the under part of the electrode and the slag. The voltage may suitably be so regulated that an arc is formed between the under part of the electrode and the slag bath. Hereby the slag-bath is heated very strongly and the main course of the reaction therefore concentrated within a very little space in close proximity to the slag-bath. Metal reduced out of the briquettes will therefore almost immediately drop down into the slag-bath and thus has a very little possibility to react for formation of carbides with the carbon material added in form of lumps or grains. In order to further diminish the possibilities of reduced metal to coming in direct contact with lumps or grains of carbon material, one part of the carbon reducing agents added outside of the ore containing briquettes may be briquetted together with additions to the charge of mainly slag forming nature. The carbon material added as lumps or grains will mainly enter into reaction first when it comes into contact with the slag, whose temperature shall be kept high in order to prevail for the necessary conditions for refining formed carbides. To facilitate this procedure, the composition of the slag should be so chosen that its smelting point is in the neighbourhood of or even higher than the temperature necessary in each special case for effecting a thorough refining.

The charging material may be added continually or discontinually which last named manner as a rule is to be preferred, if the charging material does not contain a high percentage of carbonaceous reducing agent in lump or grain form. Reducing carbon of lump or grain form present in the charge is preferably mixed with the ore briquettes at or before the charging operation. In some cases it has, however, proved to be of advantage after a tapping, first to add a part of the lump or grain formed reducing carbon and thereupon a mixture of the remaining material.

Above was stated that all or a part of the reducing agent not contained in the ore briquettes might be added in the form of metallic reagents. These reducing agents may be mixed with the other charging material. As a rule it is however better first to let a certain quantity of the other charging material be smelted down, and suitably also further heated for refining, before the metallic reagent is added. By the action of such reducing agent a rapid reduction of further oxide quantities is effected. The quantity of such reducing agent may of course be varied within rather wide limits, but should generally be lower than 50% of the total quantity of reducing agent. In many cases it has proved to be quite sufficient to use about 10% of this more expensive reducing agent. The term "metallic reagent" in the description and the claims is intended to include silicon and alloys. As an example of metallic reagents may be mentioned aluminum, silicium, calcium, and alloys containing them, such as ferro-silicium, ferro-aluminum, silicium-calcium. When producing chromium or chromium alloys, a reducing agent containing chromium, and silicium or aluminum, or all three of them is used with advantage. When producing manganese alloys, a reducing agent in the form of silicium-manganese is preferably used. The metallic reagent should preferably have a higher specific gravity than the slag bath.

The present process can be carried out in furnaces of the commonly used types for electro-metallurgical processes, for instance of a similar kind as those used in the manufacture of ferro-silicium. The bottom of the furnace should however generally be made of noncarbonaceous material.

For the briquetting, known methods and binding agents may be used, such as pitch, sulphite-lye, tar, lime, clay and water, and others. The material should be finely ground and intimately mixed.

The following examples of the application of the invention are given:

When producing aluminum or high-percentage aluminum alloys in accordance with this invention, the charge will consist of a mixture of briquettes containing material holding aluminum oxide and carbonaceous reducing agent, the remaining reducing agent being added as lump or grain formed reducing carbon, such as char-coal, anthracite and coke. In the charge should preferably also be present a sulphurous material, such as $CaS$, $Al_2S_3$, $BaSO_4$ or $CaSO_4$, and the necessary quantity of reducing agent for the formation of $BaS$ or $CaS$ respectively. It is suitable to add between 30 and 60% of the reducing agent as lump or grain formed reducing carbon, while with a lower percentage thereof a decomposition of briquettes coming into contact with the slag may occur to an unfavourable extent on account of the fluidity of the sulphide slag. Examples of the composition of the charge:

Ex. 1.—Briquettes, 1200 kg. (containing 1000 kg. of bauxite, 140 kg. of coke, 60 kg. of pitch); coke in lump form, 170 kg.; CaS, 125 kg.

The production of high-percentage silicium alloys is carried out in a similar way as that described above for aluminum.

When producing ferro-chromium, however, the reducing agent not briquetted together with chromium oxide ore may be added wholly or partly as lumps or grains of carbon material and in the latter case partly as a metallic reagent. Alternatively one part of the carbon material, which is not briquetted together with chromium oxide ore, may be briquetted together with certain additions of mainly slag-forming nature. Following example is given:

Ex. 2.—Chromium oxide ore containing briquettes, 1120 kg. (containing 1000 kg. of chromium ore, 70 kg. of coke, and 50 kg. of pitch); slag-forming material containing briquettes, 177 kg. (containing 100 kg. of chromium slag, 30 kg. of lime, 40 kg. of coke, and 7 kg. of pitch); coke in lump form, 30 kg.; char-coal in lump form, 25 kg.

When using a metallic reagent the process is for instance so carried out that a charge of briquettes first is smelted together with lump or grain formed reducing carbon. The quantity of reducing agent may for instance be so adapted that the slag will contain about 25% of $Cr_2O_3$. On account of the slag then containing a high percentage of $Cr_2O_3$, the refining is facilitated so that a product with a very low percentage of carbon is received. Thereupon so much chromium silicon, ferrosilicon, or the like, is added that for instance about half of the chromium in the slag is reduced out.

In a similar way as chromium and chromium alloys several other metals may be produced out of their respective oxides or oxide ores, for instance manganese, tungsten, vanadium, iron and others, and alloys containing such metals.

The invention also embraces such a modification of the process, in which the charge besides the above mentioned ingredients also contains a certain part of ore in lump form together with the corresponding quantity of reducing agent.

The term "briquettes" in the claims is intended to include all kinds of lumps containing the mixed material referred to.

With the word "lumps" in the claims are understood pieces ranging in size from that of a grain up to larger size.

I claim:

1. Process for producing metals or alloys with affinity to carbon, comprising reducing in an electric furnace oxides by means of carbon admixed in the charge to one part as ingredients of briquettes of a mixture of oxide raw material and carbon, and to another part, not less than 20 percent, as lumps of carbon material.

2. Process for producing metals or alloys with affinity to carbon, comprising reducing in an electric furnace oxides by means of carbon admixed to one part, not less than 25 percent and not more than 80 percent, as ingredients of briquettes of a mixture of oxide raw material and carbon and to another part, not less than 20 percent, as lumps of carbon material.

3. Process of producing metals or alloys with affinity to carbon, comprising reducing in an electric furnace oxides by means of carbon, admixing the latter to the charge to one part, not less than 25 percent, as ingredients of briquettes of a mixture of oxide raw material and carbon, and admixing another part, not less than 20 percent, of the carbon material and another part of the oxide raw material each separately in form of lumps.

4. Process for producing metals or alloys with affinity to carbon, comprising reducing in an electric furnace oxides by means of carbon admixed to one part as ingredients of briquettes of a mixture of oxide raw material and carbon, the latter in an amount corresponding to the reduction of between 40 to 70 percent of the oxide to be reduced out of the briquettes, and to another part admixed as lumps of carbon material.

5. Process for producing metals and alloys with affinity to carbon comprising reducing oxide raw material added as ingredients of briquettes of a mixture of oxide raw material and an unsufficient amount of carbon material for its reduction, on fusing in an electric furnace, partly by means of the carbon content in the briquettes and to another part not less than 20 and not more than 75 percent by means of carbon reducing agents admitted outside of said briquettes.

6. Process for producing low carbon metals or alloys comprising fusing briquettes of a mixture of oxide raw material and carbon, in an electric furnace together with another part of the reducing agent admixed as lumps of carbon material forming on fusing a refining slag covering the metal or alloy and refining the metal or alloy by strongly heating the slag before tapping.

7. Process for producing low carbon metals or alloys comprising fusing briquettes of a mixture of oxide raw material and carbon, the latter in an amount not less than 25 and not more than 80 percent of the total amount of reducing agents, in an electric furnace together with another part of the reducing agents not less than 20 percent in form of lumps of carbon material, regulating the slag forming ingredients in the charge as to form a refractory refining slag covering the reduced metal or alloy and refining the metal or alloy by strongly heating the slag before tapping.

8. Process for producing low carbon metals or alloys comprising fusing briquettes of a mixture of oxide raw material and carbon the latter in a quantity not less than 25 percent of the total amount of reducing agent, in an electric furnace together with another part not less than 20 percent of the reducing agents in form of lumps of carbon material, regulating the amount of named reducing agent as to form a slag still containing a considerable amount of the oxide to be reduced and before tapping reducing oxide out of said slag by means of a metallic reagent.

9. Process for producing aluminum or aluminum alloys by reducing aluminum oxide containing material with carbon in an electric furnace comprising admitting one part of the carbon in form of lumps of carbon material and another part as ingredients of briquettes of a mixture of carbon material and aluminum oxide raw material.

10. Process for producing aluminum or aluminum alloys comprising fusing briquettes of a mixture of aluminum oxide raw material and at least 25 percent of the reducing agents in form of carbon material, in an electric furnace together with not less than 20 percent of the reducing agent in form of lumps of carbon material.

11. Process for producing aluminum or aluminum alloys comprising fusing briquettes of a mixture of aluminum oxide material and one part of the carbon reducing agent, in an electric furnace together with lumps of carbon material, forming on fusing a sulfide containing slag by means of sulfide slag forming additions.

12. Process for producing aluminum or aluminum alloys comprising fusing briquettes of a mixture of aluminum oxide material and at least 25 percent of the reducing agents in form of carbon material, in an electric furnace together with not less than 20 percent of the reducing agents added in form of lumps of carbon material, forming on fusing over the reduced metal or alloy a slag containing to a main part calcium sulfide.

In witness whereof I have hereunto set my hand.

TURE ROBERT HAGLUND.